June 2, 1964    D. A. HAMILTON    3,135,260
PLASTIC SYRINGE

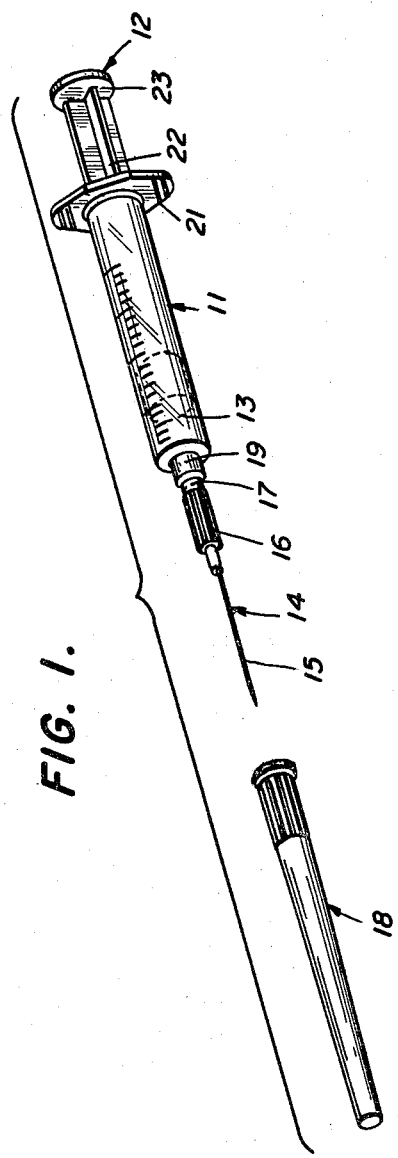
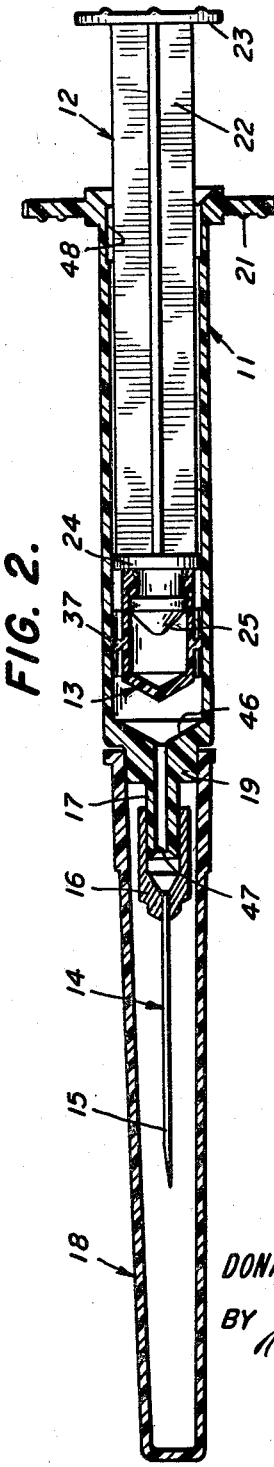

Filed June 8, 1962    2 Sheets-Sheet 2

INVENTOR
DONALD A. HAMILTON
BY *Robert F. Merrick*

United States Patent Office 3,135,260
Patented June 2, 1964

3,135,260
PLASTIC SYRINGE
Donald A. Hamilton, Burbank, Calif., assignor to Pharmaseal Laboratories, Glendale, Calif., a corporation of California
Filed June 8, 1962, Ser. No. 201,001
8 Claims. (Cl. 128—218)

This invention relates to an all plastic syringe and more particularly to a disposable syringe, wherein the barrel, plunger and plunger sealing tip are formed of plastic which is resistant to chemical attack by injectable drugs, and which will provide an effective seal against leakage, either under pressure or vacuum, during use of the syringe, even after prolonged storage.

Disposable syringes have been made with polystyrene barrels and plungers, and rubber plunger sealing tips on the plunger. These syringes are very effective in use with most injectable drugs, but the polystyrene barrels or the rubber plunger tips are attacked by certain medications which cause swelling or which form solutions which could be toxic to the patient if injected. More resistant plastics have been used, but the rubber plunger tip still prevents the use of such syringes with certain drugs.

Attempts have been made to produce a satisfactory all-plastic syringe with the barrel, plunger and sealing tip all made of plastics compatible with all injectable drugs. Some of these materials are so opaque that it is impossible to observe the fluid contents of the barrel. Other materials were not satisfactory, because the plastic did not have sufficient elastic recovery after deformation, and the syringes were not consistent in their ability to seal under both pressure and vacuum. If sufficient interference was obtained to seal against leakage, the friction between the plunger tip and the barrel was so excessive that the plunger was very difficult to move in the barrel, and particularly when the plunger was moved slowly, the plunger would first stick and then suddenly surge forward, and then stick again, which made accurate administration of the medicament almost impossible.

Briefly stated, one preferred embodiment of the present invention has a cylindrical plastic barrel and a plastic plunger integrally formed with a tip end shaped to receive a plunger sealing tip. The sealing tip is preferably formed of the softest grade of low density polyethylene, but may be formed of other suitable plastics such as medium density or high density linear polyethylene, polypropylene or nylon. The plunger sealing tip is preferably a separate snap-on tip which is removably mounted by forcing it over the tip end of the plunger, but may be integrally formed on a ribbed or cylindrical plunger. The barrel is preferably a molded cylinder with substantially no draft or taper, or with the minimum internal taper or draft which may be needed to facilitate mold release.

The outside diameter of the plunger sealing tip is preferably slightly larger than the inside diameter of the barrel to provide a slight interference, and if desired the outer portion of the barrel adjacent its open end may have a diameter slightly larger than the outside diameter of the plunger sealing tip to relieve the pressure thereon during storage. This prevents the permanent set or cold flow that occurs in plastic materials after being under stress for a period of time, particularly at elevated temperatures.

The plunger sealing tip of the present invention is preferably provided with a conical nose portion which is complementary to the frusto-conical inner end of the barrel, the latter being substantially closed except for a passage therethrough for the ejection of fluid. The peripheral portion of the plunger sealing tip has a concentric, thin wall tube or annular skirt with a central annular recessed portion spaced from the walls of the barrel so as to provide a space containing a relatively viscous lubricant. At each end, the annular skirt tapers outwardly to relatively thin and narrow annular rings which have an annular peripheral surface flexibly contacting the inner surface of the barrel wall.

The annular skirt is connected to the body of the sealing tip by a relatively narrow, flexible, annular web or bridge which permits a certain degree of freedom or relative movement between the plunger and the annular skirt. This permits a slight movement or wobble of the plunger in the barrel without canting or cocking the plunger tip with respect to the axis of the barrel and without disturbing or breaking the seal between the two thin annular rings and the internal surface of the barrel.

To provide a smooth easy movement of the plunger in the barrel without chatter or a jerky movement, and still obtain a good seal on both the pressure and vacuum strokes, it is usually desirable to provide a suitable lubricant in the recess between the skirt and the barrel. The fluorocarbon lubricants having a greasy consistency and containing trifluorochloroethylene polymers have been found particularly appropriate for use in this syringe.

One object of the present invention is to provide an all-plastic syringe having a plunger which is compatible with injectable drugs, maintains a tight seal on both the vacuum and pressure strokes, and slides freely and smoothly within the barrel to facilitate the administration of an accurate dosage.

Other objects and many of the attending advantages of this invention will be readily appreciated as the same becomes better understood by reference to the following detailed description when considered in connection with the accompanying drawings wherein:

FIGURE 1 is an exploded pictorial view illustrating one preferred embodiment of the all-plastic syringe of the present invention;

FIGURE 2 is an enlarged, sectional view taken axially through the assembled syringe, needle and protector cap of FIGURE 1.

Figure 3:
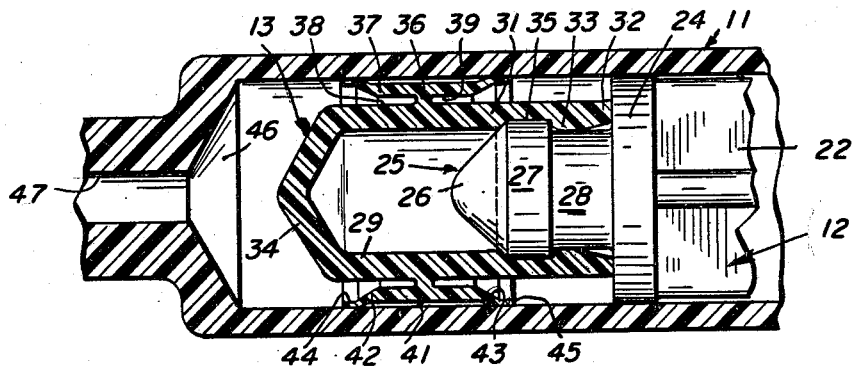
FIGURE 3 is a further enlarged, fragmentary, sectional view illustrating the detailed configuration of the plastic plunger sealing tip.

Referring now to the drawings in detail and more particularly to FIGURES 1, 2 and 3, one preferred embodiment of the present invention is illustrated therein including a transparent plastic barrel 11 in which the plunger 12 and the snap-on plastic plunger sealing tip 13 are slidably mounted.

The conventional hypodermic needle 14 has a cannula 15 secured to a hub 16, the latter being attached firmly onto the tip 17 on the end of barrel 11. The protector 18 fits over the needle 14 and engages the collar 19 of the barrel 11. These parts are assembled in the manner shown in FIGURE 2.

The outer end of the barrel 11 is open and is provided with a ribbed flange or finger grip 21 for engagement by the fingers of the operator. The body of the plunger 12 is provided with 4 radial ribs which form a light, rigid, central body portion 22 and which terminate in an integrally formed outer disc 23 adapted to be engaged by an operator's thumb for operation of the syringe. The other end of the central plunger body portion 22 terminates in an inner disc 24, which has a slightly smaller diameter than the inside of the barrel 11 and which is integrally connected to the tip end 25. The whole plunger 12 may be integrally molded or otherwise formed from any suitable rigid plastic material, since it is not contacted by drugs or medicaments in the syringe.

One preferred embodiment of the present invention is shown in FIGURE 3, wherein the plunger sealing tip 13 is shown mounted on the tip end 25 of plunger 12. The plunger tip end 25 consists of a rounded conical nose portion 26 connected to a cylindrical portion 27, which in turn is connected to the inner disc 24 by a reduced diameter neck portion 28.

The body 29 of sealing tip 13 is adapted to snap on over the plunger tip end 25 until the cylindrical portion 27 firmly engages the sleeve 31. Sleeve 31 is integrally connected to a collar 32 having a thickened wall to form an internal annular bead 33 which engages the shoulder at the rear of cylindrical portion 27 and the reduced diameter neck portion 28 to releasably retain the sealing tip 13 thereon.

The collar 32 is tapered outwardly to provide a flared mouth or frusto-conical opening which readily receives the conical nose portion 26, with resultant spreading and enlarging of collar 32 as the sealing tip 13 is snapped onto plunger tip end 25. The body 29 of sealing tip 13 also includes a conical nose portion 34 which has substantially parallel inner and outer conical surfaces integrally connected or formed with sleeve 31.

If desired the sleeve 31 may be provided with an annular recess 35 which conforms to and engages the periphery of the cylindrical portion 27 of the tip end 25 to firmly hold the sealing tip 13.

In this form of the invention a flexible annular web 36 is integrally formed around the body 29 at the central or intermediate portion of the cylindrical sleeve 31 and spaced from recess 35 so that it is not unduly distorted by expansion of collar 32. Web 36 integrally connects sleeve 31 to a thin wall tube or annular skirt 37. Skirt 37 is spaced from sleeve 31 to provide a double undercut at 38 and 39 and is spaced from the wall of barrel 11 to provide a shallow annular recess 41 containing a fluorocarbon lubricant.

Skirt 37 tapers outwardly along its inner surface at its inner and outer ends, as indicated at 42 and 43, to form two annular rings 44, 45, having peripheral surfaces which engage the internal walls of barrel 11. Each narrow ring 44, 45, terminates in a very thin, continuous, uninterrupted, leading or trailing feather edge section which contacts a continuous annular portion of the inner surface of barrel 11. These thin edge sections should be from 0.0005 to 0.007 inch thick, and are preferably between 0.003 and 0.005 inch thick to provide the desired flexibility. Such edge sections are difficult to make because the mold does not fill properly, but they can be advantageously formed as a cylindrical flash concentric with and parallel to the axis of sealing tip 13. This will result in some variation on the length of rings 44, 45, but surprisingly does not interfere with their operation.

The outside diameter of the two annular rings 44 and 45 should be slightly greater than the internal diameter of the barrel 11. Since they are relatively thin, continuous rings and are connected to the tapered portions 42 and 43, they will exert a radially outward pressure. This pressure maintains good sealing contact with the walls of the barrel on either the vacuum or the pressure stroke and also serves to wipe thin the layer of fluorocarbon lubricant from recess 41 which adheres to the inner surface of barrel 11.

It should be noted that in the modification of FIGURE 3 the central portion of skirt 37 is connected by flexible web 36 to the central portion of sleeve 31 and the front flange or annular ring 44 terminates approximately in line with the conical surface of the nose 34. In this way, this flange will not be bent or folded over, as it reaches the end of the barrel with the nose 34 engaging a frusto-conical end section 46 of the barrel which leads to the passage 47 through which the liquid is expelled.

When the plunger is to be stored for a long time in the barrel, it may be desirable to make the inside diameter of the barrel slightly larger at the storage position near the outer end. For example, an annular groove 48 may be provided near the open end of barrel 11 (FIGURE 2) where it does not interfere with action of the syringe in normal use. During storage, however, skirt 37 may be located in groove 48. This prevents cold flow due to compressive stress and results in a tighter seal between the annular rings on the skirt and the inside wall of the barrel when plunger tip 13 is moved forward during actual use of the syringe.

In use, pressure develops in the front of the syringe as plunger 12 is urged forward. This pressure acts on the tapered skirt portion 42 and the thin annular ring 44 to expand the latter outwardly against the inner surface of barrel 11. Moreover, pressure in undercut 38 encourages bending of entire front section of skirt 42 and flexible web 36 to improve the efficiency of the seal between ring 44 and barrel 11. Likewise, withdrawal of plunger 12 on the suction or vacuum stroke causes pressure in undercut 39 and facilitates sealing of ring 45 with the inner surface of barrel 11.

Flexible web 36 also distorts when plunger 12 wobbles or rocks, thus preventing the sealing rings 44, 45 from being pulled away from the barrel wall so as to lose pressure or vacuum.

Figure 4:
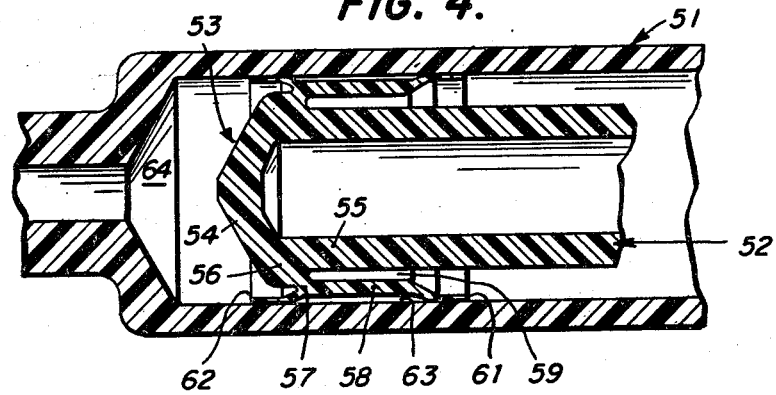
FIGURE 4 is an enlarged view similar to FIGURE 3 but illustrating one modification of the present invention.

The modification of the plunger sealing tip illustrated in FIGURE 4 is mounted in a barrel 51, similar to barrel 11 illustrated in FIGURES 1, 2 and 3. In this modification the plunger 52 is integrally formed with the plunger sealing tip 53, and the plunger tip skirt 58 is arranged to provide an improved seal on the vacuum stroke.

The nose portion 54 in this modification has a somewhat heavier wall formed by two substantially parallel inner and outer frusto-conical surfaces, and the cylindrical body 55 of the plunger sealing tip 53 is also somewhat heavier than the cylindrical body 31 in FIGURE 3. These heavier walls are generally necessary to compensate for the more flexible material used, since the plunger is formed as an integral one-piece unit with the sealing tip.

The peripheral portion or shoulder 56 of the nose portion 54 is also relatively heavy and thick, and is connected along its outer edge to a thin, flexible, annular web or bridge 57 to the thin-walled tube or skirt 58 which is separated by the undercut 59 from the cylindrical body 55.

The outer end of the skirt 58 is tapered outwardly to a thin, annular ring 61 which terminates in a very thin, feather edge with an annular peripheral surface contacting the inner wall of the barrel 51 to provide an effective seal between the plunger sealing tip 53 and barrel 51, particularly on the suction stroke when the plunger 52 is moved outwardly in the barrel 51.

The skirt 58, where it joins annular web 57, tapers outwardly and forwardly to another thin annular ring 62 also terminating in a feather edge which provides a peripheral annular surface contacting the internal wall of the barrel 51 to provide an effective seal, particularly on the forward or pressure stroke of the plunger 52. Between the thin rings 61 and 62, skirt 58 provides a shallow annular recess 63 in which there may be held a thick fluorocarbon lubricant to help prevent leakage and to provide a smooth action of plunger 52 in barrel 51.

It should be noted in this modification that the skirt 58 is connected at its forward or inner end to the outer edge of the heavy annular shoulder 56 on the conical nose portion 54, whereas the skirt or thin-walled tube 37 is connected at a central portion by the annular web 36 to the cylindrical body or sleeve 31 at a position substantially spaced outwardly from the conical nose portion 34. This modification retains less medicament when the plunger tip 53 is at its forwardmost position, but requires that sealing ring 62 be made of a more resilient material so that it is not permanently distorted or otherwise damaged by the frusto-conical end section 64 of barrel 51.

As previously described, the fluorocarbon lubricants of greasy consistency have been found to be surprisingly effective in the syringe of my invention. Specific examples of these lubricants are sold under the trade names of "Fluorolube," which may be obtained from the Hooker Chemical Corporation in various viscosities, depending on the degree of polymerization, and "Kel F," which may be obtained in a grease form from the Minnesota Mining and Manufacturing Company. Both of these lubricants are trifluorochloroethylene polymers and are preferably applied as a thick, heavy coating in the shallow annular recesses 41, 63, and 85 on the plunger sealing tips illustrated in FIGURES 3, 4, and 5.

These lubricants are far superior to other lubricants which are quite satisfactory for other applications. For example, when lubricants such as the silicone greases and fluoro-silicone greases are used, the plunger tends to chatter, or stick and slip, providing a very jerky movement which makes it extremely difficult to administer an accurate dosage. Apparently, these other lubricants do not have sufficient adhesion to the polypropylene of polyethylene plastics, even though they may function as suitable lubricants in other applications.

Obviously, many other modifications and variations of the present invention may be made within the scope of the following claims.

What is claimed is:

1. A plastic syringe comprising: a substantially cylindrical barrel having an open end, a partially closed end opposite said end, and an opening extending through the partially closed end for ejection of fluid from said barrel, a plunger mounted for longitudinal axial movement within said barrel and having a body portion extending outwardly through the open end of said barrel, and a plastic plunger sealing tip connected to said plunger and having a body with a nose portion integrally formed with a cylindrical sleeve, said plunger sealing tip having an annular skirt with a shallow annular recess forming thin annular rings at the inner and outer ends of said skirt, said rings having peripheral annular surfaces contacting the walls of said barrel, and a narrow flexible annular web integrally formed and interconnecting said annular skirt and said plunger sealing tip body, said annular skirt being undercut to provide flexibility and relative movement with respect to said plunger and said cylindrical sleeve.

2. A plastic syringe as set forth in claim 1 wherein: said narrow flexible annular web is formed intermediate the ends of said skirt and is connected to said cylindrical sleeve a substantial distance outwardly from said nose portion.

3. A plastic syringe comprising: a substantially cylindrical barrel having one open end and a partially closed frusto-conical end opposite said open end with an opening extending therefrom for ejection of fluid from said barrel, a plunger mounted for longitudinal axial movement within said barrel and having a body portion extending outwardly through the open end of said barrel, and a plastic plunger sealing tip connected to said plunger and having a conical nose portion complementary to said frusto-conical end of said barrel, said nose portion being integrally formed with a cylindrical sleeve, said plunger sealing tip having a thin annular skirt with a shallow annular recess forming narrow annular rings at the inner and outer ends of said skirt with peripheral annular surfaces contacting the walls of said barrel, and a narrow flexible annular web integrally formed and interconnecting said annular skirt and said cylindrical sleeve and nose portion, said annular skirt being undercut to provide flexibility and relative movement with respect to said plunger and said cylindrical sleeve.

4. A plastic syringe as set forth in claim 3 wherein: said narrow flexible annular web is formed intermediate the ends of said skirt and is connected to said cylindrical sleeve a substantial distance outwardly from said conical nose portion.

5. A plastic syringe comprising: a generally cylindrically barrel having an open end and an opposed, partially closed end; a tubular tip extending from said partially closed end, and having an axial, outlet passage; a plunger mounted for longitudinal axial movement within said barrel and having inner and outer ends; a plunger sealing tip mounted on the inner end of the plunger and having a generally cylindrical body portion; a flexible web extending radially outwardly from said body; an annular skirt integrally formed with said web, extending therefrom in a direction parallel to the barrel axis and concentric with the barrel walls, and being spaced from the body to provide an annular recess between the inner surface of the skirt and the body; sections of the skirt tapering outwardly along their inner surfaces toward each end of the skirt; and an annular sealing ring on each end of the skirt, each of said rings having a longitudinal peripheral surface engaging a longitudinal portion of the barrel wall and terminating in a very thin, continuous, feather edge section.

6. A plastic syringe as set forth in claim 5 wherein the feather edge sections are formed of cylindrical flash concentric with and parallel to the barrel axis, said feather edges having a thickness of from 0.0005 to 0.007 inch and being variable in length.

7. A plastic syringe as set forth in claim 5 wherein the barrel and plunger sealing tip are formed of thermoplastic materials selected from the class consisting of polyethylene and polypropylene; an annular recess is defined by the wall of the barrel, the plunger tip skirt, and the two annular rings on the skirt; and said recess is substantially filled with a fluorocarbon lubricant grease.

8. A plastic syringe comprising: a barrel having an open end and an opposed, partially closed end; a tubular tip extending from said partially closed end, and having an outlet passage; a plunger having an inner end mounted for longitudinal movement within said barrel; a plunger sealing tip mounted on the inner end of the plunger and having a body portion; a flexible web extending radially outwardly from said body; an annular skirt extending from said web in a direction parallel to the barrel axis and concentric with the barrel walls, said skirt being spaced from the body to provide an annular recess therebetween; and an annular sealing ring on each end of the skirt, each of said rings having a longitudinal peripheral surface engaging a longitudinal portion of the barrel wall and terminating in a thin, feather edge section.

References Cited in the file of this patent

UNITED STATES PATENTS

| Re. 19,219 | Smith | June 19, 1934 |
| 718,979 | Campbell | Jan. 27, 1903 |
| 3,050,059 | Wall et al. | Aug. 21, 1962 |

FOREIGN PATENTS

| 1,104,570 | France | June 15, 1955 |
| 125,879 | Russia | May 27, 1959 |
| 1,228,933 | France | Mar. 21, 1960 |
| 1,242,553 | France | Aug. 22, 1960 |